United States Patent
Nguyen et al.

(10) Patent No.: US 9,909,057 B2
(45) Date of Patent: Mar. 6, 2018

(54) METHODS FOR ETCHING FRACTURES AND MICROFRACTURES IN SHALE FORMATIONS

(71) Applicant: Halliburton Energy Services, Inc., Houston, TX (US)

(72) Inventors: Philip D. Nguyen, Houston, TX (US); Jim D. Weaver, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 55 days.

(21) Appl. No.: 14/888,016

(22) PCT Filed: Sep. 20, 2013

(86) PCT No.: PCT/US2013/060904
§ 371 (c)(1),
(2) Date: Oct. 29, 2015

(87) PCT Pub. No.: WO2015/041678
PCT Pub. Date: Mar. 26, 2015

(65) Prior Publication Data
US 2016/0108307 A1    Apr. 21, 2016

(51) Int. Cl.
| | | |
|---|---|---|
| *E21B 43/26* | (2006.01) | |
| *C09K 8/74* | (2006.01) | |
| *C09K 8/86* | (2006.01) | |
| *C09K 8/92* | (2006.01) | |

(Continued)

(52) U.S. Cl.
CPC .............. *C09K 8/74* (2013.01); *C09K 8/725* (2013.01); *C09K 8/86* (2013.01); *C09K 8/92* (2013.01);

(Continued)

(58) Field of Classification Search
CPC ...... E21B 43/267; E21B 43/26; E21B 33/138; E21B 43/261; C09K 8/516; C09K 8/72; C09K 8/74
See application file for complete search history.

(56) References Cited

U.S. PATENT DOCUMENTS

| | | | | |
|---|---|---|---|---|
| 2006/0229212 A1* | 10/2006 | Willberg | ............... | C09K 8/03 507/219 |
| 2011/0005760 A1* | 1/2011 | Hartman | ............... | C09K 8/536 166/308.1 |

(Continued)

FOREIGN PATENT DOCUMENTS

WO    WO-2015/041678    3/2015

OTHER PUBLICATIONS

Cipolla, C. L. et al., "The Relationship Between Fracture Complexity, Reservoir Properties, and Fracture Treatment Design", Society of Petroleum Engineers, SPE 115769, Sep. 21-24, 2008, 2008 SPE Annual Technical Conference and Exhibition held in Denver, Colorado, USA, 25 pgs.

(Continued)

*Primary Examiner* — Zakiya W Bates
(74) *Attorney, Agent, or Firm* — Craig W. Roddy; Tumey L.L.P.

(57) ABSTRACT

A method of treating a subterranean formation includes providing a treatment fluid comprising particles of at least one of a hydrolysable in-situ acid generator and a hydrolysable in-situ chelating agent generator. The treatment fluid is combined with a carrier fluid and is introduced into a subterranean formation. The particles are placed in fractures or microfractures where, upon the hydrolyzing of the acid or chelating agent generator, etching of the faces of the fractures or microfractures occurs.

20 Claims, 1 Drawing Sheet

(51) Int. Cl.
  *C09K 8/72* (2006.01)
  *E21B 43/25* (2006.01)
(52) U.S. Cl.
  CPC .............. *E21B 43/25* (2013.01); *E21B 43/26* (2013.01); *C09K 2208/28* (2013.01)

(56) References Cited

U.S. PATENT DOCUMENTS

| | | | |
|---|---|---|---|
| 2011/0048719 A1* | 3/2011 | Baihly | E21B 43/16 166/305.1 |
| 2011/0120712 A1 | 5/2011 | Todd et al. | |
| 2011/0272159 A1 | 11/2011 | Osiptsov et al. | |
| 2013/0025867 A1 | 1/2013 | Sun et al. | |
| 2013/0161003 A1 | 6/2013 | Makarychev-Mikhailov et al. | |

OTHER PUBLICATIONS

"Methods for Enhancing and Maintaining Fracture Conductivity After Fracturing Shale Formations without Proppant Placement", Appl No. PCT/US2013/060876, filed Sep. 20, 2013, 30 pgs.

"Latent Curing Agent Compatible with Low pH Frac Fluids", Appl No. PCT/US2013/060885, filed Sep. 20, 2013, 30 pgs.

"PCT International Search Report and Written Opinion", dated Jun. 20, 2014, Appl No. PCT/US2013/06904, "Methods for Etching Fractures and Microfractures in Shale Formations," filed Sep. 20, 2013, 15 pgs.

PCT International Preliminary Report on Patentability, dated Mar. 31, 2016, Appl No. PCT/US2013/06904, "Methods for Etching Fractures and Microfractures in Shale Formations," Filed Sep. 20, 2013.

\* cited by examiner

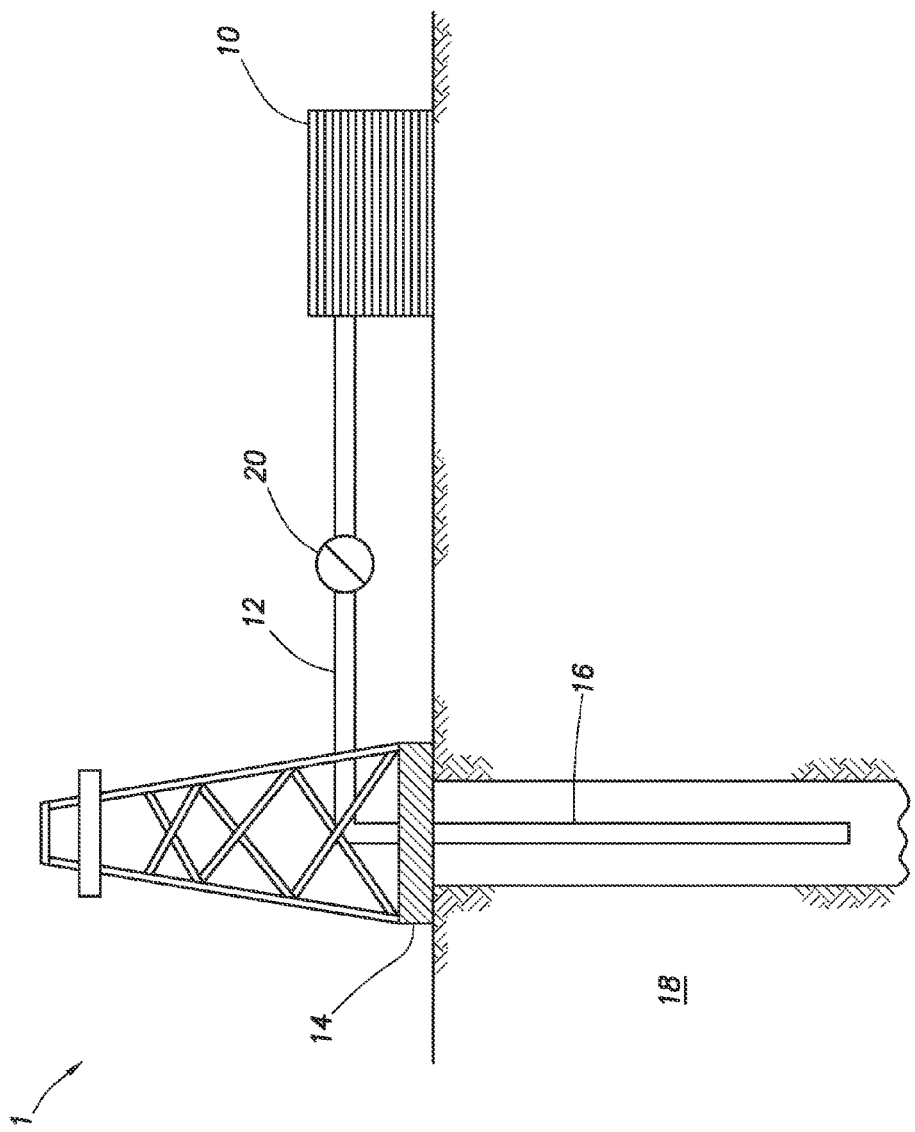

METHODS FOR ETCHING FRACTURES AND MICROFRACTURES IN SHALE FORMATIONS

BACKGROUND

The present invention generally relates to the use fracturing etching treatment fluids in subterranean operations, and, more specifically, to the use of acidizing or chelating treatment fluids comprising particles of acid generating compounds or chelating agent generating compounds, and methods of using these treatment fluids in subterranean operations.

Many petroleum-containing formations also contain unconsolidated granular mineral material such as sand or gravel. After completion, production of fluids from the formation causes the flow of the particulate matter into the wellbore, which often leads to any of several difficult and expensive problems. Unconsolidated subterranean zones include those which contain loose particulates that are readily entrained by produced fluids and those wherein the particulates making up the zone are bonded together with insufficient bond strength to withstand the forces produced by the production of fluids through the zone. Sometimes a well is said to "sand up", meaning the lower portion of the production well becomes filled with sand, after which further production of fluid from the formation becomes difficult or impossible. In other instances, sand production along with the fluid results in passage of granular mineral material into the pump and associated hardware of the producing well, which causes accelerated wear of the mechanical components of the producing oil well. Sustained production of sand sometimes forms a cavity in the formation which collapses and destroys the well.

Oil or gas residing in the subterranean formation may be recovered by stimulation treatments, which fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production.

A widely used stimulation technique is acidizing, in which a treatment fluid including an aqueous acid solution is introduced into the formation to dissolve acid-soluble materials. In this way, hydrocarbon fluids can more easily flow from the formation into the well. In addition, an acid treatment can facilitate the flow of injected treatment fluids from the well into the formation. Acidizing techniques can be carried out as matrix acidizing procedures or as acid fracturing procedures. In matrix acidizing, an acidizing fluid is injected from the well into the formation at a rate and pressure below the pressure sufficient to create a fracture in the formation. In sandstone formations, the acid primarily removes or dissolves acid soluble damage in the near wellbore region and is thus classically considered a damage removal technique and not a stimulation technique. In carbonate formations, the goal is to actually a stimulation treatment where in the acid forms conducted channels called wormholes in the formation rock. In acid fracturing, an acidizing fluid is pumped into a carbonate formation at a sufficient pressure to cause fracturing of the formation and creating differential (non-uniform) etching fracture conductivity.

Conventional acid fracturing does not provide an effective means for etching the fracture faces, including those of microfractures since most of the activity of the acid or chelating agent is consumed by the time it reaches the target area. Also, the current use of liquid acid tends to cover or distribute over the broad surface of the fracture face, thus diminishing its effectiveness of clay solids dissolving ability.

Accordingly, an ongoing need exists for methods of etching the fracture faces of fractures and microfractures in shale formations to enhance production without the use of a propping agent.

BRIEF DESCRIPTION OF THE DRAWINGS

The following FIGURE is included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

FIG. 1 depicts an embodiment of a system configured for delivering the consolidating agent composition comprising treatment fluids of the embodiments described herein to a downhole location.

DETAILED DESCRIPTION

In some embodiments of the present invention, a method of treating a wellbore in a subterranean formation includes providing a first fluid comprising particles of at least one of a hydrolysable in-situ acid generator, a hydrolysable in-situ chelating agent generator, and mixtures thereof; providing a carrier fluid; placing a first stream comprising the first fluid and the carrier fluid into a zone in a shale formation, said zone comprising at least one of fractures and microfractures; allowing at least one component of said first stream to hydrolyze; and etching the faces of the at least one of fractures and microfractures.

In various embodiments, the hydrolyzable in-situ acid generator is a solid, and upon being exposed to water, an acid is generated by hydrolysis. Similarly, a hydrolysable in-situ chelating agent results in a chelating agent upon hydrolysis. The rate at which the acid or chelating agent generator is hydrolyzed may be controlled such that most of the activity of the acid or chelating agent is not consumed before it reaches the targeted areas, such as the faces of fractures and microfractures.

In certain embodiments of the present invention, a method of treating a subterranean formation comprises placing a first stream comprising particles of at least one of a hydrolysable in-situ acid generator, a hydrolysable in-situ chelating agent generator, and mixtures thereof, and a carrier fluid into a wellbore in a subterranean formation, said formation comprising at least one of fractures and microfractures; allowing at least one component of said first stream to hydrolyze; and etching the faces of the at least one of fractures and microfractures.

Some embodiments of the present invention provide a method for treating a well including providing a wellbore in a subterranean formation comprising at least one of fractures and microfractures; providing a tackifying agent; providing a first carrier fluid; placing a first stream comprising the tackifying agent and the first carrier fluid into a shale formation to contact the at least one of fracture and microfracture faces; providing a first treatment comprising particles of at least one of a hydrolysable in-situ acid generator, a hydrolysable in-situ chelating agent generator, and mixtures thereof; providing a second carrier fluid; placing a second stream comprising the first treatment component and second carrier fluid into a zone in the shale formation, said zone comprising at least one of fractures and microfractures; allowing at least one component of said first treatment component to hydrolyze; and etching the faces of the at least one of fractures and microfractures.

Another embodiment of the invention includes a well treatment system including a well treatment apparatus configured to: provide a first fluid comprising particles of at least one of a hydrolysable in-situ acid generator, a hydrolysable in-situ chelating agent generator, and mixtures thereof; provide a carrier fluid; place a first stream comprising the first fluid and the carrier fluid into a zone in a shale formation, said zone comprising at least one of fractures and microfractures; allow at least one component of said first stream to hydrolyze; and etch the faces of the at least one of fractures and microfractures.

In one embodiment, a method of treating a wellbore in a subterranean formation includes providing a first fluid comprising particles of at least one of a hydrolysable in-situ acid generator, a hydrolysable in-situ chelating agent generator, and mixtures thereof; providing a carrier fluid; placing a first stream comprising the first fluid and the carrier fluid into a zone in a shale formation, said zone comprising at least one of fractures and microfractures; allowing at least one component of said first stream to hydrolyze; and etching the faces of the at least one of fractures and microfractures. In certain embodiments, the etching results in the formation of at least one of channels, gaps, or combinations thereof, between the at least one of fractures and microfracture faces. In many embodiments, the fractures comprise microfractures and microfracture faces. In some embodiments, the hydrolysable in-situ acid generator comprises at least one hydrolysable acid ester. The hydrolysable acid esters may comprise at least one member selected from the group consisting of homo- and copolymers of lactic and glycolic acid; homo- and copolymers of vinyl methylsulphonate and vinyl methylphosphonate and dimethylphosphonate; and any combination thereof. Other suitable hydrolysable acid-generating compounds include: esters including, but not limited to, ethylene glycol monoformate; ethylene glycol diformate; diethylene glycol diformate; glyceryl monoformate; glyceryl diformate; glyceryl triformate; triethylene glycol diformate; and formate esters of pentaerythritol. In certain embodiments, the hydrolysable acid ester is present in the amount of about 0.1% to about 25% by weight of the carrier fluid, preferably from about 1% to about 10% by weight of the carrier fluid. In some embodiments, hydrolysable in-situ chelating agent generator comprises at least one polymer capable of hydrolyzing to an acid and a chelating agent. In several embodiments, the polymer comprises at least one of the following monomers: phosphonate monomers, sulfonate monomers, and combinations thereof. In exemplary embodiments, the phosphonate monomers comprise at least one of 2-Aminoethylphosphonic acid, Dimethyl methylphosphonate, 1-Hydroxy Ethylidene-1,1-Diphosphonic Acid, Amino tris(methylene phosphonic acid), Ethylenediamine tetra(methylene phosphonic acid), Tetramethylenediamine tetra(methylene phosphonic acid), Hexamethylenediamine tetra(methylene phosphonic acid), Diethylenetriamine penta(methylene phosphonic acid), Phosphonobutane-tricarboxylic acid, N-(phosphonomethyl) iminodiacetic acid, 2-Carboxyethyl phosphonic acid, 2-Hydroxyphosphonocarboxylic acid, Amino-tris-(methylene-phosphonic acid), and combinations thereof. In certain embodiments, the hydrolysable in-situ chelating agent generator is present in the amount of about 0.1% to about 25% by weight of the carrier fluid, preferably from about 1% to about 10% by weight of the carrier fluid. In an embodiment, the hydrolysable acid generator or chelating agent generator are micro-particles. In some embodiments, the micro-particle sizes are about 0.1 µm to about 150 µm, preferably from about 5 µm to about 100 µm. In a few embodiments, the micro-particles have the shape of at least one of rods, fibers, spheres, ovals, strips, ribbons, flakes, platelets, and mixtures thereof. In other embodiments, the hydrolysable acid generator or chelating agent generator particles are encapsulated in a degradable material. In certain embodiment, the carrier fluid comprises a non-aqueous base fluid. In further embodiments, the aqueous base fluid comprises a slickwater fluid. In several embodiments, the first stream or a separate stream further comprises a tackifying agent. In exemplary embodiments, the tackifying agent comprises at least one selected from the group consisting of: a non-aqueous tackifying agent, an aqueous tackifying agent, a silyl-modified polyamide, a reaction product of an amine and a phosphate ester; and combinations thereof. In certain embodiments, the tackifying agent is present in the amount of about 0.01% to about 10% by weight of the carrier fluid, preferably from about 0.1% to about 5% by weight of the carrier fluid.

Some embodiments of the present invention provide a method for treating a well including placing a first stream comprising particles of at least one of a hydrolysable in-situ acid generator, a hydrolysable in-situ chelating agent generator, and mixtures thereof, and a carrier fluid into a wellbore in a subterranean formation, said formation comprising at least one of fractures and microfractures; allowing at least one component of said first stream to hydrolyze; and etching the faces of the at least one of fractures and microfractures. In certain embodiments, the etching results in the formation of at least one of channels, gaps, or combinations thereof, between the at least one of fractures and microfracture faces. In many embodiments, the fractures comprise microfractures and microfracture faces. In some embodiments, the hydrolysable in-situ acid generator comprises at least one hydrolysable acid ester. The hydrolysable acid esters may comprise at least one member selected from the group consisting of homo- and copolymers of lactic and glycolic acid; homo- and copolymers of vinyl methylsulphonate and vinyl methylphosphonate and dimethylphosphonate; and any combination thereof. Other suitable hydrolysable acid-generating compounds include: esters including, but not limited to, ethylene glycol monoformate; ethylene glycol diformate; diethylene glycol diformate; glyceryl monoformate; glyceryl diformate; glyceryl triformate; triethylene glycol diformate; and formate esters of pentaerythritol. In certain embodiments, the hydrolysable acid ester is present in the amount of about 0.1% to about 25% by weight of the carrier fluid, preferably from about 1% to about 10% by weight of the carrier fluid. In some embodiments, hydrolysable in-situ chelating agent generator comprises at least one polymer capable of hydrolyzing to an acid and a chelating agent. In several embodiments, the polymer comprises at least one of the following monomers: phosphonate monomers, sulfonate monomers, and combinations thereof. In exemplary embodiments, the phosphonate monomers comprise at least one of 2-Aminoethylphosphonic acid, Dimethyl methylphosphonate, 1-Hydroxy Ethylidene-1,1-Diphosphonic Acid, Amino tris(methylene phosphonic acid), Ethylenediamine tetra(methylene phosphonic acid), Tetramethylenediamine tetra(methylene phosphonic acid), Hexamethylenediamine tetra(methylene phosphonic acid), Diethylenetriamine penta(methylene phosphonic acid), Phosphonobutane-tricarboxylic acid, N-(phosphonomethyl)iminodiacetic acid, 2-Carboxyethyl phosphonic acid, 2-Hydroxyphosphonocarboxylic acid, Amino-tris-(methylene-phosphonic acid), and combinations thereof. In certain embodiments, the hydrolysable in-situ chelating agent generator is present in the amount of about 0.1% to about 25% by weight of the carrier fluid, preferably from about 1% to about 10% by weight of the carrier fluid. In an embodiment, the hydrolysable acid generator or chelating agent generator are micro-particles. In some embodiments, the micro-particle sizes are about 0.1 µm to about 150 µm, preferably from about 5 µm to about 100 µm. In a few embodiments, the micro-particles have the shape of at least one of rods, fibers, spheres, ovals, strips, ribbons, flakes, platelets, and mixtures thereof. In other embodiments, the hydrolysable acid generator or chelating agent generator particles are encapsulated in a degradable material. In certain embodiment, the carrier fluid comprises a non-aqueous base fluid. In further embodiments, the aqueous base fluid comprises a slickwater fluid. In several embodiments, the first stream or a separate stream further comprises a tackifying agent. In certain embodiments, the tackifying agent is present in the amount of about 0.01 to about 10% by weight of the carrier fluid, preferably from about 0.1% to about 5% by weight of the carrier fluid.

One embodiment of the invention includes a well treatment method including providing a wellbore in a subterranean formation comprising at least one of fractures and microfractures; providing a tackifying agent; providing a first carrier fluid; placing a first stream comprising the tackifying agent and the first carrier fluid into a shale formation to contact the at least one of fractures and microfracture faces; providing a first treatment comprising particles of at least one of a hydrolysable in-situ acid generator, a hydrolysable in-situ chelating agent generator, and mixtures thereof; providing a second carrier fluid; placing a second stream comprising the first treatment component and second carrier fluid into a zone in the shale formation, said zone comprising at least one of fractures and microfractures; allowing at least one component of said first treatment component to hydrolyze; and etching the faces of the at least one of fractures and microfractures. In certain embodiments, the etching results in the formation of at least one of channels, gaps, or combinations thereof, between the at least one of fractures and microfracture faces. In many embodiments, the fractures comprise microfractures and microfracture faces. In some embodiments, the hydrolysable in-situ acid generator comprises at least one hydrolysable acid ester. The hydrolysable acid esters may comprise at least one member selected from the group consisting of homo- and copolymers of lactic and glycolic acid; homo- and copolymers of vinyl methylsulphonate and vinyl methylphosphonate and dimethylphosphonate; and any combination thereof. Other suitable hydrolysable acid-generating compounds include: esters including, but not limited to, ethylene glycol monoformate; ethylene glycol diformate; diethylene glycol diformate; glyceryl monoformate; glyceryl diformate; glyceryl triformate; triethylene glycol diformate; and formate esters of pentaerythritol. In certain embodiments, the hydrolysable acid ester is present in the amount of about 0.1% to about 25% by weight of the carrier fluid, preferably from about 1% to about 10% by weight of the carrier fluid. In some embodiments, hydrolysable in-situ chelating agent generator comprises at least one polymer capable of hydrolyzing to an acid and a chelating agent. In several embodiments, the polymer comprises at least one of the following monomers: phosphonate monomers, sulfonate monomers, and combinations thereof. In exemplary embodiments, the phosphonate monomers comprise at least one of 2-Aminoethylphosphonic acid, Dimethyl methylphosphonate, 1-Hydroxy Ethylidene-1,1-Diphosphonic Acid, Amino tris(methylene phosphonic acid), Ethylenediamine tetra(methylene phosphonic acid), Tetramethylenediamine tetra(methylene phosphonic acid), Hexamethylenediamine tetra(methylene phosphonic acid), Diethylenetriamine penta(methylene phosphonic acid), Phosphonobutane-tricarboxylic acid, N-(phosphonomethyl)iminodiacetic acid, 2-Carboxyethyl phosphonic acid, 2-Hydroxyphosphonocarboxylic acid, Amino-tris-(methylene-phosphonic acid), and combinations thereof. In certain embodiments, the hydrolysable in-situ chelating agent generator is present in the amount of about 0.1% to about 25% by weight of the carrier fluid, preferably from about 1% to about 10% by weight of the carrier fluid. In an embodiment, the hydrolysable acid generator or chelating agent generator are micro-particles. In some embodiments, the micro-particle sizes are about 0.1 µm to about 150 µm, preferably from about 5 µm to about 100 µm. In a few embodiments, the micro-particles have the shape of at least one of rods, fibers, spheres, ovals, strips, ribbons, flakes, platelets, and mixtures thereof. In other embodiments, the hydrolysable acid generator or chelating agent generator particles are encapsulated in a degradable material. In certain embodiment, the carrier fluid comprises a non-aqueous base fluid. In further embodiments, the aqueous base fluid comprises a slickwater fluid. In several embodiments, the first stream or a separate stream further comprises a tackifying agent. In exemplary embodiments, the tackifying agent comprises at least one selected from the group consisting of: a non-aqueous tackifying agent, an aqueous tackifying agent, a silyl-modified polyamide, a reaction product of an amine and a phosphate ester; and combinations thereof. In certain embodiments, the tackifying agent is present in the amount of about 0.01% to about 10% by weight of the carrier fluid, preferably from about 0.1% to about 5% by weight of the carrier fluid.

Another embodiment of the invention includes a well treatment system including a well treatment apparatus configured to: provide a first fluid comprising particles of at least one of a hydrolysable in-situ acid generator, a hydrolysable in-situ chelating agent generator, and mixtures thereof; provide a carrier fluid; place a first stream comprising the first fluid and the carrier fluid into a zone in a shale formation, said zone comprising at least one of fractures and microfractures; allow at least one component of said first stream to hydrolyze; and etch the faces of the at least one of fractures and microfractures. In certain embodiments, the etching results in the formation of at least one of channels, gaps, or combinations thereof, between the at least one of fractures and microfracture faces. In many embodiments, the fractures comprise microfractures and microfracture faces. In some embodiments, the hydrolysable in-situ acid generator comprises at least one hydrolysable acid ester. The hydrolysable acid esters may comprise at least one member selected from the group consisting of homo- and copolymers of lactic and glycolic acid; homo- and copolymers of vinyl methylsulphonate and vinyl methylphosphonate and dimethylphosphonate; and any combination thereof. Other suitable hydrolysable acid-generating compounds include: esters including, but not limited to, ethylene glycol monoformate; ethylene glycol diformate; diethylene glycol diformate; glyceryl monoformate; glyceryl diformate; glyceryl triformate; triethylene glycol diformate; and formate esters of pentaerythritol. In certain embodiments, the hydrolysable acid ester is present in the amount of about 0.1% to about 25% by weight of the carrier fluid, preferably from about 1% to about 10% by weight of the carrier fluid. In some embodiments, hydrolysable in-situ chelating agent generator comprises at least one polymer capable of hydrolyzing to an acid and a chelating agent. In several embodiments, the polymer comprises at least one of the following monomers: phosphonate monomers, sulfonate monomers, and combinations thereof. In exemplary embodiments, the phosphonate monomers comprise at least one of 2-Aminoethylphosphonic acid, Dimethyl methylphosphonate, 1-Hydroxy Ethylidene-1,1-Diphosphonic Acid, Amino tris(methylene phosphonic acid), Ethylenediamine tetra(methylene phosphonic acid), Tetramethylenediamine tetra(methylene phosphonic acid), Hexamethylenediamine tetra(methylene phosphonic acid), Diethylenetriamine penta(methylene phosphonic acid), Phosphonobutane-tricarboxylic acid, N-(phosphonomethyl)iminodiacetic acid, 2-Carboxyethyl phosphonic acid, 2-Hydroxyphosphonocarboxylic acid, Amino-tris-(methylene-phosphonic acid), and combinations thereof. In certain embodiments, the hydrolysable in-situ chelating agent generator is present in the amount of about 0.1% to about 25% by weight of the carrier fluid, preferably from about 1% to about 10% by weight of the carrier fluid. In an embodiment, the hydrolysable acid generator or chelating agent generator are micro-particles. In some embodiments, the micro-particle sizes are about 0.1 µm to about 150 µm, preferably from about 5 µm to about 100 µm. In a few embodiments, the micro-particles have the shape of at least one of rods, fibers, spheres, ovals, strips, ribbons, flakes, platelets, and mixtures thereof. In other embodiments, the hydrolysable acid generator or chelating agent generator particles are encapsulated in a degradable material. In certain embodiment, the carrier fluid comprises a non-aqueous base fluid. In further embodiments, the aqueous base fluid comprises a slickwater fluid. In several embodiments, the first stream or a separate stream further comprises a tackifying agent. In exemplary embodiments, the tackifying agent comprises at least one selected from the group consisting of: a non-aqueous tackifying agent, an aqueous tackifying agent, a silyl-modified polyamide, a reaction product of an amine and a phosphate ester; and combinations thereof. In certain embodiments, the tackifying agent is present in the amount of about 0.01% to about 10% by weight of the carrier fluid, preferably from about 0.1% to about 5% by weight of the carrier fluid.

One of the advantages of some embodiments of the present invention is the ability to tailor the rate of the hydrolyzing of the acid generator or chelating agent generator to the actual well conditions. This may occur by changing the composition of the carrier fluid, or of the encapsulation material. Other advantages may be evident to one skilled in the art.

In certain embodiments, before the reaction occurs, the treatment fluids of the present invention may comprise a carrier fluid; a hydrolysable in-situ acid generator; and or a hydrolysable in-situ chelating agent generator. After the hydrolysis of the acid or chelating agent generator occurs, a treatment fluid in accordance with the present invention may comprise a carrier fluid and at least one of an acid and a chelating agent.

Carrier Fluids

In some embodiments, carrier fluids are used to deliver the hydrolysable in-situ acid generator and hydrolysable in-situ chelating agent generator particles into a wellbore. The carrier fluid that is used to deposit the particles in the fracture may be the same fluid that is used in a fracturing operation or may be a second fluid that is introduced into the well after the fracturing fluid is introduced. The carrier fluids may include non-aqueous base fluids; aqueous base fluids, slick water fluids; and combinations thereof.

Non-Aqueous Base Fluids

In exemplary embodiments, non-aqueous base fluids may be used in the carrier fluids. Examples of non-aqueous fluids include alcohols such as methanol, ethanol, isopropanol, and other branched and linear alkyl alcohols; diesel; paraffinic solvent; raw crude oils; condensates of raw crude oils; refined hydrocarbons such as naphthalenes, xylenes, toluene and toluene derivatives, hexanes, pentanes; and combinations thereof. In some embodiments, the non-aqueous carrier fluid is present in the treatment fluid the amount of from about 0.1% to about 50% by volume of the treatment fluid, preferably from about 1% to about 25%.

Aqueous Base Fluids

The aqueous base fluid of the present embodiments can generally be from any source, provided that the fluids do not contain components that might adversely affect the stability and/or performance of the treatment fluids of the present invention. In various embodiments, the aqueous carrier fluid can comprise fresh water, salt water, seawater, brine, or an aqueous salt solution. In some embodiments, the aqueous carrier fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. In some embodiments, the aqueous carrier fluid can be a high density brine. As used herein, the term "high density brine" refers to a brine that has a density of about 10 lbs/gal or greater (1.2 g/cm$^3$ or greater).

Hydraulic fracturing treatment that may utilize friction-reducing polymers is referred to as slick water fracturing. The friction-reducing polymer is generally included in the fracturing fluid in an amount sufficient to provide the desired friction reduction without gel formation. Typically, a well treatment fluid in which a polymer is used as a friction reducer has a viscosity in the range of about 0.7 cP to about 10 cP. For the purposes of this disclosure, viscosities are measured at room temperature using a FANN® Model 35 viscometer at 300 rpm with a ⅕ spring.

A wide variety of friction reducing polymers may be suitable for use with the present invention. In certain embodiments, the friction-reducing polymer may be a synthetic polymer. Additionally, for example, the friction-reducing polymer may be an anionic polymer or a cationic polymer, in accordance with embodiments of the present invention. By way of example, suitable synthetic polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters, quaternized aminoalkyl acrylate, such as a copolymer of acrylamide and dimethylaminoethyl acrylate quaternized with benzyl chloride, and mixtures thereof.

One example of a suitable anionic friction-reducing polymer is a polymer comprising acrylamide and acrylic acid. The acrylamide and acrylic acid may be present in the polymer in any suitable concentration. An example of a suitable anionic friction reducing polymer may comprise acrylamide in an amount in the range of from about 5% to about 95% and acrylic acid in an amount in the range of from about 5% to about 95%. Another example of a suitable anionic friction-reducing polymer may comprise acrylamide in an amount in the range of from about 60% to about 90% by weight and acrylic acid in an amount in the range of from about 10% to about 40% by weight. Another example of a suitable anionic friction-reducing polymer may comprise acrylamide in an amount in the range of from about 80% to about 90% by weight and acrylic acid in an amount in the range of from about 10% to about 20% by weight. Yet another example of a suitable anionic friction-reducing polymer may comprise acrylamide in an amount of about 85% by weight and acrylic acid in an amount of about 15% by weight. As previously mentioned, one or more additional monomers may be included in the anionic friction reducing polymer comprising acrylamide and acrylic acid. By way of example, the additional monomer(s) may be present in the anionic friction-reducing polymer in an amount up to about 20% by weight of the polymer.

Suitable friction-reducing polymers may be in an acid form or in a salt form. As will be appreciated, a variety of salts may be prepared, for example, by neutralizing the acid form of the acrylic acid monomer or the 2-acrylamido-2-methylpropane sulfonic acid monomer. In addition, the acid form of the polymer may be neutralized by ions present in the treatment fluid. As used herein, the term "polymer" is intended to refer to the acid form of the friction-reducing polymer, as well as its various salts.

In some embodiments, the aqueous carrier fluid is present in the treatment fluid the amount of from about 85% to about 98% by volume of the treatment fluid. In another embodiment, the aqueous carrier fluid is present in the amount of from about 90% to about 98% by volume of the treatment fluid. In further embodiments, the aqueous carrier fluid is present in the amount of from about 94% to about 98% by volume of the treatment fluid. When the solubility of the polyvalent metal salt of carboxylic acid, the water-soluble polymerization initiator, or other components that may be added to the fluids described herein are low, a solvent may optionally be included with the aqueous base fluid so as to aid in solubility and/or polymerization and curing of the polyvalent metal salt of carboxylic acid. Suitable examples of solvents may include, but are not limited to, an alcohol (e.g., isopropyl alcohol, methanol, butanol, and the like); a glycol (e.g., ethylene glycol, propylene glycol, and the like); a glycol ether (e.g., ethyleneglycol monomethyl ether, ethylene glycol monobutylether, and the like); a polyether (e.g., polypropylene glycol); and any combination thereof. For purposes of this disclosure, a material is considered as water-soluble if the solubility of the material in water at room temperature is 5% or higher.

Hydrolysable Acid Generating Compounds

The treatment fluids of the present invention also include hydrolysable in-situ acid generating compounds. In some embodiments, these are esters, aliphatic polyesters, ortho esters, which may also be known as ortho ethers, poly (ortho esters), which may also be known as poly(ortho ethers), poly(lactides), poly(glycolides), poly(c-caprolactones), poly(hydroxybutyrates), poly(anhydrides), or copolymers thereof. Derivatives and combinations also may be suitable. The term "copolymer" as used herein is not limited to the combination of two polymers, but includes any combination of polymers, e.g., terpolymers. In several embodiments, the hydrolysable acid ester comprises at least one member selected from the group consisting of homo- and copolymers of lactic and glycolic acid, homo- and copolymers of vinyl methylsulphonate and vinyl methylphosphonate and dimethylphosphonate; and any combination thereof. Other suitable acid-generating compounds include: esters including, but not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. In various embodiments, an amount of the hydrolysable in-situ acid generating compound present in the treatment fluids is from about 1 wt. % to about 30 wt. %, alternatively, about 5 wt. % to about 20 wt. % alternatively about 10 wt. % to about 15 wt. % based on weight of carrier fluid used in the treatment fluid.

Hydrolysable Chelating Agent Generating Compounds

The treatment fluids of the present invention also include hydrolysable in-situ chelating agent generating compounds. In some embodiments, hydrolysable in-situ chelating agent generator comprises at least one polymer capable of hydrolyzing to an acid and a chelating agent. In several embodiments, the polymer comprises at least one of the following monomers: phosphonate monomers, sulfonate monomers, and combinations thereof. In exemplary embodiments, the phosphonate monomers comprise at least one of 2-Aminoethylphosphonic acid, Dimethyl methylphosphonate, 1-Hydroxy Ethylidene-1,1-Diphosphonic Acid, Amino tris(methylene phosphonic acid), Ethylenediamine tetra(methylene phosphonic acid), Tetramethylenediamine tetra(methylene phosphonic acid), Hexamethylenediamine tetra(methylene phosphonic acid), Diethylenetriamine penta(methylene phosphonic acid), Phosphonobutane-tricarboxylic acid, N-(phosphonomethyl)iminodiacetic acid, 2-Carboxyethyl phosphonic acid, 2-Hydroxyphosphonocarboxylic acid, Amino-tris-(methylene-phosphonic acid), and combinations thereof. In certain embodiments, the hydrolysable in-situ chelating agent generator is present in the amount of about 0.1% to about 25% by weight of the carrier fluid.

Encapsulated Compounds

In some embodiments, hydrolysable in-situ acid generating compound is encapsulated in a hydrolysable material. In certain embodiments, the encapsulated hydrolysable material forms a capsule. Compounds comprising an acid generator or a chelating agent generator suitable for use in the present invention may be at least partially coated or encapsulated with slowly water soluble or other similar encapsulating materials. Such materials are well known to those skilled in the art. Examples of water-soluble and other similar encapsulating materials that can be utilized include, but are not limited to, porous solid materials such as precipitated silica, elastomers, polyvinylidene chloride (PVDC), nylon, waxes, polyurethanes, cross-linked partially hydrolyzed acrylics, and the like. Using encapsulated well treatment chemicals permits blending of normally incompatible compounds in the treatment fluid. As a non-limiting example, the present invention permits the transport of the hydrolysable acid generator to a downhole environment by a treatment fluid having a neutral or basic pH without detrimentally impacting either the treatment fluid or the acid generating compound, such as an acid ester. A non-limiting list of mechanisms suitable for releasing the encapsulated acid and chelating generating compounds includes: a change in pH, crushing, rupture, dissolution of the membrane, diffusion and/or thermal melting of the encapsulating membrane. Following placement of the compounds downhole, the acid generating compounds are then released from the capsules and allowed to react. The controlled downhole release of the acid and chelating agent generating compounds will significantly improve their functionality.

Particles

As used herein, a "particle" refers a body having a finite mass and sufficient cohesion such that it can be considered as an entity but having relatively small dimensions. As used herein, a particle can be of any size ranging from molecular scale particles to macroscopic particles, depending on context. A particle can be in any physical state. For example, a particle of a substance in a solid state can be as small as a few molecules on the scale of nanometers up to a large particle on the scale of a few millimeters, such as large grains of sand. Similarly, a particle of a substance in a liquid state can be as small as a few molecules on the scale of nanometers or a large drop on the scale of a few millimeters. A particle of a substance in a gas state is a single atom or molecule that is separated from other atoms or molecules such that intermolecular attractions have relatively little effect on their respective motions. Particulates as used herein, "particulate" or "particulate material" refers to matter in the physical form of distinct particles. A particulate is a grouping of particles based on common characteristics, including chemical composition and particle size range, particle size distribution, or median particle size. As used herein, a particulate is a grouping of particles having similar chemical composition and particle size ranges anywhere in the range of about 1 micrometer (e.g., microscopic clay or silt particles) to about 3 millimeters (e.g., large grains of sand). A particulate will have a particle size distribution ("PSD"). As used herein, "the size" of a particulate can be determined by methods known to persons skilled in the art.

In certain embodiments of the invention "micro-particle" means a particle size of about 0.1 μm to about 150 μm, preferably from about 5 μm to about 100 μm.

Degradable Solid Particulate

The first solid particulate for use in the methods according to the invention is selected to be degradable. Preferably, any second solid particulate is also selected to be degradable, although any second solid particulate is not required to be degradable. As the first solid particulate is degradable, when the first solid particulate degrades any second particulate should be small enough to pass through the pore throats of the proppant pack. The chemical composition of the second solid particulate can be the same or different as the first solid particulate.

As used herein, a degradable material is capable of undergoing an irreversible degradation downhole. The term "irreversible" as used herein means that the degradable material once degraded should not recrystallize or reconsolidate while downhole in the treatment zone, that is, the degradable material should degrade in situ but should not recrystallize or reconsolidate in situ.

The terms "degradable" or "degradation" refer to both the two relatively extreme cases of degradation that the degradable material may undergo, that is, heterogeneous (or bulk erosion) and homogeneous (or surface erosion), and any stage of degradation in between these two. Preferably, the degradable material of the particulate degrades slowly over time as opposed to instantaneously.

Particles of the present invention may have any shape, including but not limited to particles having the physical shape of platelets, shavings, flakes, ribbons, rods, strips, spheroids, toroids, pellets, tablets, or any other physical shape. One of ordinary skill in the art with the benefit of this disclosure will recognize the specific degradable material and the preferred size and shape for a given application.

In general, selection of a degradable particulate and fracturing fluid depends on a number of factors including: (1) the degradability of the material of the particulate; (2) the particle size of the particulate; (3) the pH of the fracturing fluid, if water-based; (4) the design temperature; and (5) the loading of degradable particulate in the fracturing fluid. The step of designing or determining a fracturing stage preferably includes selecting a suitable degradable particulate and fracturing fluid for the fracturing stage.

Tackifying Agents

The treatment fluids of the present invention may optionally include a tackifying agent. A hydraulic treatment may involve treating the fracture faces with a tackifying agent as part of the pad treatment stage. Microfracture faces may also be treated. The tacky film allows the micro-particulates of acid or chelating agent generator to attach to the fracture faces such that these particulates are anchored in place while the acid or chelating agent is generated, thereby allowing the etching of fracture faces to take place locally. A variety of tacking agents can be used in accordance with the present embodiments. In some embodiments, the tackifying agent comprises at least one tackifying agent selected from the group consisting of: a non-aqueous tackifying agent, an aqueous tackifying agent, a silyl-modified polyamide, a reaction product of an amine and a phosphate ester; and combinations thereof.

One type of tackifying agent suitable for use in the present invention is a non-aqueous tackifying agent. A particularly preferred group of tackifying agents comprise polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like.

Aqueous tackifying agents suitable for use in the present invention are not significantly tacky when placed onto a particulate, but are capable of being "activated" (that is destabilized, coalesced and/or reacted) to transform the compound into a sticky, tackifying compound at a desirable time. Such activation may occur before, during, or after the aqueous tackifying agent is placed in the subterranean formation. Examples of aqueous tackifying agents suitable for use in the present invention include, but are not limited to: acrylic acid polymers; acrylic acid ester polymers; acrylic acid derivative polymers; acrylic acid homopolymers; acrylic acid ester homopolymers (such as poly(methyl acrylate), poly (butyl acrylate), and poly(2-ethylhexyl acrylate)); acrylic acid ester co-polymers; methacrylic acid derivative polymers; methacrylic acid homopolymers; methacrylic acid ester homopolymers (such as poly(methyl methacrylate), poly(butyl methacrylate), and poly(2-ethylhexyl methacrylate)); acrylamido-methyl-propane sulfonate polymers; acrylamido-methyl-propane sulfonate derivative polymers; acrylamido-methyl-propane sulfonate co-polymers; and acrylic acid/acrylamido-methyl-propane sulfonate co-polymers, derivatives thereof, and combinations thereof.

In certain embodiments, the tackifying agent is present in the amount of about 0.01% to about 10% by weight of the carrier fluid.

Having the benefit of the present disclosure and knowing the temperature and chemistry of a subterranean formation of interest, one having ordinary skill in the art will be able to choose a tackifying agent and an amount thereof suitable for producing a desired tackiness of the fracture faces or the microfracture faces.

Other Additives

In addition to the foregoing materials, it can also be desirable, in some embodiments, for other components to be present in the treatment fluid. Such additional components can include, without limitation, particulate materials, fibrous materials, bridging agents, weighting agents, gravel, corrosion inhibitors, catalysts, clay control stabilizers, biocides, bactericides, friction reducers, gases, surfactants, solubilizers, salts, scale inhibitors, foaming agents, anti-foaming agents, iron control agents, and the like.

The treatment fluids of the present invention may be prepared by any method suitable for a given application. For example, certain components of the treatment fluid of the present invention may be provided in a pre-blended powder or a dispersion of powder in a non-aqueous liquid, which may be combined with the carrier fluid at a subsequent time. After the preblended liquids and the carrier fluid have been combined other suitable additives may be added prior to introduction into the wellbore. As used herein, the term "substantially solids-free" refers to a fluid having less than 10% by weight of solid particulates included therein. Those of ordinary skill in the art, with the benefit of this disclosure will be able to determine other suitable methods for the preparation of the treatments fluids of the present invention.

The methods of the present invention may be employed in any subterranean treatment where a viscoelastic treatment fluid may be used. Suitable subterranean treatments may include, but are not limited to, fracturing treatments, sand control treatments (e.g., gravel packing), and other suitable stimulation treatments where a treatment fluid of the present invention may be suitable. Other potential applications of this resin system, with some minor adjustments such as modifying the dilution factor with the carrier fluid or component concentrations include: remedial proppant/gravel treatments, near-wellbore formation sand consolidation treatments for sand control, consolidating-while-drilling target intervals, and plugging-and-abandonment of wellbores in subterranean formations.

In addition to the fracturing fluid, other fluids used in servicing a wellbore may also be lost to the subterranean formation while circulating the fluids in the wellbore. In particular, the fluids may enter the subterranean formation via lost circulation zones for example, depleted zones, zones of relatively low pressure, zones having naturally occurring fractures, weak zones having fracture gradients exceeded by the hydrostatic pressure of the drilling fluid, and so forth.

In an embodiment, the treatment fluid is placed into a wellbore as a single stream and activated by downhole conditions to form new channels or gaps in fracture faces and or microfracture faces.

In an embodiment, the consolidation treatment fluid may be introduced into the wellbore, the formation, or a lost circulation zone as a single pill fluid. That is, in such an embodiment, all components of the treatment fluid may be mixed and introduced into the wellbore as a single composition. In an alternative embodiment, the consolidation treatment fluid may be introduced into the wellbore, the formation, or the lost circulation zone sequentially in multiple components. As will be understood by those of ordinary skill in the art, it may be desirable or advantageous to introduce components of the consolidation treatment fluid separately and sequentially.

In still another exemplary embodiment, the separate introduction of at least two of the lost circulation treatment fluid components may be achieved by introducing the components within a single flowpath, but being separated by a spacer. Such a spacer may comprise a highly viscous fluid which substantially or entirely prevents the intermingling of the consolidation treatment fluid components while being pumped into a wellbore. Such spacers and methods of using the same are generally known to those of ordinary skill in the art.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

Shale is a sedimentary rock derived from mud. Shale rock is commonly finely laminated (bedded). Particles in shale are commonly clay minerals mixed with tiny grains of quartz eroded from pre-existing rocks. Shale is a type of sedimentary rock that contains clay and minerals such as quartz.

As used herein, into a well means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

Hydraulic fracturing, sometimes referred to as fracturing or fracing, is a common stimulation treatment. A treatment fluid adapted for this purpose is sometimes referred to as a fracturing fluid. The fracturing fluid is pumped at a sufficiently high flow rate and pressure into the wellbore and into the subterranean formation to create or enhance a fracture in the subterranean formation. Creating a fracture means making a new fracture in the formation. Enhancing a fracture means enlarging a pre-existing fracture in the formation. In wells penetrating certain formations, it is often desirable to create relatively small fractures referred to in the art as "microfractures" in the formations near the wellbores to facilitate creation of hydraulically induced enlarged fractures.

The substance of a "gel" is a colloidal dispersion. A gel is formed by a network of interconnected molecules, such as of a crosslinked polymer or of micelles, which at the molecular level are attracted to molecules in liquid form. The network gives a gel phase its structure (apparent yield point) and contributes to stickiness (tack). By weight, the substance of gels is mostly liquid, yet they behave like solids due to the three-dimensional network with the liquid. At the molecular level, a gel is a dispersion in which the network of molecules is continuous and the liquid is discontinuous.

In various embodiments, systems configured for delivering the treatment fluids described herein to a downhole location are described. In various embodiments, the systems can comprise a pump fluidly coupled to a tubular, the tubular containing the hydrolysable in-situ acid generator and/or hydrolysable in-situ chelating agent generator, and any additional additives disclosed herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for carrier downhole.

FIG. 1 shows an illustrative schematic of a system that can deliver treatment fluids of the embodiments disclosed herein to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a treatment fluid of the embodiments disclosed herein may be formulated. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18. Pump 20 may be configured to raise the pressure of the treatment fluid to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 1, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim. Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method of treating a wellbore in a subterranean formation comprising:
   providing a first fluid comprising particles of at least one of a hydrolysable in-situ acid generator, a hydrolysable in-situ chelating agent generator, and mixtures thereof;
   providing a carrier fluid;
   placing a first stream comprising the first fluid and the carrier fluid into a zone in a shale formation, said zone comprising microfractures;
   allowing at least one component of said first stream to hydrolyze; and
   etching the faces of the microfractures.

2. The method of claim 1, wherein the etching results in the formation of at least one of channels, gaps, or combinations thereof, between the microfracture faces.

3. The method of claim 1, wherein the hydrolysable in-situ acid generator comprises at least one hydrolysable acid ester.

4. The method of claim 3, wherein the hydrolysable acid ester comprises at least one member selected from the group consisting of homo- and copolymers of lactic and glycolic acid, homo- and copolymers of vinyl methylsulphonate and vinyl methylphosphonate and dimethylphosphonate; and any combination thereof.

5. The method of claim 1, wherein the hydrolysable in-situ chelating agent generator comprises at least one polymer capable of hydrolyzing to an acid and a chelating agent.

6. The method of claim 5, wherein the polymer comprises at least one of the following monomers: phosphonate monomers, sulfonate monomers, and combinations thereof.

7. The method of claim 6, wherein the phosphonate monomers comprise at least one of 2-Aminoethylphosphonic acid, Dimethyl methylphosphonate, 1-Hydroxy Ethylidene-1,1-Diphosphonic Acid, Amino tris(methylene phosphonic acid), Ethylenediamine tetra(methylene phosphonic acid), Tetramethylenediamine tetra(methylene phosphonic acid), Hexamethylenediamine tetra(methylene phosphonic acid), Diethylenetriamine penta(methylene phosphonic acid), Phosphonobutane-tricarboxylic acid, N-(phosphonomethyl)iminodiacetic acid, 2-Carboxyethyl phosphonic acid, 2-Hydroxyphosphonocarboxylic acid, Amino-tris-(methylene-phosphonic acid), and combinations thereof.

8. The method of claim 1, wherein the particles are micro-particles.

9. The method of claim 8, wherein the micro-particles have the shape of at least one of rods, fibers, spheres, ovals, strips, ribbons, flakes, platelets, and mixtures thereof.

10. The method of claim 1, wherein the first fluid particles are encapsulated in a degradable material.

11. The method of claim 10, wherein the degradable material is a hydrolysable material that delays the generating of the acid or chelating agent.

12. The method of claim 1, wherein the carrier fluid comprises a slick water fluid.

13. The method of claim 12, wherein the slick water fluid comprises water and a friction reducer or a polymer gel.

14. The method of claim 1, further comprising a tackifying agent in the first stream or a separate stream.

15. The method of claim 1, wherein no propping agents are used.

16. A method comprising:
placing a first stream comprising particles of at least one of a hydrolysable in-situ acid generator, a hydrolysable in-situ chelating agent generator, and mixtures thereof, and a carrier fluid into a wellbore in a subterranean formation, said formation comprising microfractures;
allowing at least one component of said first stream to hydrolyze; and
etching the faces of the microfractures.

17. A method comprising:
providing a wellbore in a subterranean formation comprising microfractures;
providing a tackifying agent;
providing a first carrier fluid;
placing a first stream comprising the tackifying agent and the first carrier fluid into a shale formation to contact the microfracture faces;
providing a first treatment comprising particles of at least one of a hydrolysable in-situ acid generator, a hydrolysable in-situ chelating agent generator, and mixtures thereof;
providing a second carrier fluid;
placing a second stream comprising the first treatment component and second carrier fluid into a zone in the shale formation, said zone comprising microfractures;
allowing at least one component of said first treatment component to hydrolyze; and
etching the faces of the microfractures.

18. The method of claim 17, wherein the tackifying agent comprises at least one selected from the group consisting of: a non-aqueous tackifying agent, an aqueous tackifying agent, a silyl-modified polyamide, a reaction product of an amine and a phosphate ester; and combinations thereof.

19. The method of claim 17, wherein no propping agents are used.

20. A well treatment system comprising:
a well treatment apparatus configured to:
provide a first fluid comprising particles of at least one of a hydrolysable in-situ acid generator, a hydrolysable in-situ chelating agent generator, and mixtures thereof;
provide a carrier fluid;
place a first stream comprising the first fluid and the carrier fluid into a zone in a shale formation, said zone comprising microfractures;
allow at least one component of said first stream to hydrolyze; and
etch the faces of the microfractures, wherein no propping agents are used.

* * * * *